United States Patent [19]

Wenning et al.

[11] Patent Number: 5,034,424
[45] Date of Patent: Jul. 23, 1991

[54] RIGID FOAM AND PROCESS FOR PRODUCING THE SAME

[75] Inventors: Udo Wenning; Jan Brodsky, both of Giengen, Fed. Rep. of Germany

[73] Assignee: Bosch-Siemens Hausgeräte GmbH, Munich, Fed. Rep. of Germany

[21] Appl. No.: 547,830

[22] Filed: Jun. 28, 1990

[30] Foreign Application Priority Data

Jun. 28, 1989 [DE] Fed. Rep. of Germany ....... 3921223
Sep. 14, 1989 [DE] Fed. Rep. of Germany ....... 3930824
Oct. 31, 1989 [DE] Fed. Rep. of Germany ....... 3936245
Mar. 16, 1990 [DE] Fed. Rep. of Germany ....... 4008545

[51] Int. Cl.$^5$ ............................................. C08G 18/14
[52] U.S. Cl. ................................ 521/109.1; 521/122; 521/131
[58] Field of Search ...................... 521/109.1, 122, 131

[56] References Cited

U.S. PATENT DOCUMENTS 4,246,356 1/1981 Walmsley et al. ................. 521/131

Primary Examiner—Maurice J. Welsh
Attorney, Agent, or Firm—Herbert L. Lerner; Laurence A. Greenberg

[57] ABSTRACT

A rigid foam, especially a largely closed-cell polyurethane or polyisocyanurate rigid foam, includes a cell structure being formed by the expansion of rigid foam raw materials with carbon dioxide as an inflating agent. The cell structure is substantially homogeneous and has a cell content of substantially $CO_2$ inflating agent and proportions of a physical inflating agent being at least substantially insoluble in at least one of the rigid foam raw materials. A process for producing a rigid foam having a cell structure formed by the expansion of rigid foam raw materials with carbon dioxide includes forming a fine-celled rigid foam material by preparing an inflating agent being at least substantially insoluble in at least one of the rigid foam raw materials. The inflating agent is homogeneously emulsified in at least one of the rigid foam raw materials prior to the beginning of a chemical reaction, in the form of the disperse phase of an emulsion having a liquid droplet size being at most equal to 10 μm in diameter and a proportion by weight of less than 3.5% of the rigid foam material. The rigid foam raw materials include components for producing an essential required amount of inflating agent in the form of carbon dioxide. The rigid foam raw materials in particular are polyols and isocyanates. Activators and/or stabilizers are optionally additionally used to form the cell structure. The cell structure preferably has a cell size of less than 100 μm in diameter.

68 Claims, 1 Drawing Sheet

RIGID FOAM AND PROCESS FOR PRODUCING THE SAME

The invention relates to a rigid foam, in particular a largely closed-cell polyurethane or polyisocyanurate foam, having a cell structure which is formed by the expansion of rigid foam raw materials, in particular polyols and isocyanates, with carbon dioxide as an inflating agent, and optionally with the additional use of activators and/or stabilizers.

The term "rigid foams" is understood to refer to plastics with a cell structure produced by an expansion or foaming process, with a comparatively low weight per unit volume and with low thermal conductivity. Optionally, the foaming process can be simultaneously coupled with the production of the plastic. Such rigid foams are often used as insulators for noise abatement and/or as heat insulators in construction, in cooling and heating technology such as for household appliances, for producing composite materials, such as sandwich elements, or as expanded leather cloth, as well as for decorating material, model-making material and packaging and upholstery material.

Rigid foams based on polyurethane or polyisocyanurate are known and are produced, for instance, by exothermic reaction of a polyol with an isocyanate. The reaction speed is adjustable with a suitable activator. In order to provide the foaming, use is made of an inflating agent with a suitably located boiling point, that is soluble in the polyol, foams upon reaching its boiling point and thereby produces the pore structure. In order to improve flowability, water is generally added to the polyol and reacts with the isocyanate forming $CO_2$, which acts as an additional inflating agent.

This process is stochastic. Cells of various sizes are produced depending on the nucleation that can be attained, for instance by charging the reaction mixture with air.

The goal of any development of rigid foams, particularly those to be used for insulating purposes, is to achieve as many small, closed cells as possible.

The thermal conduction of a rigid foam is composed of four components, namely:
convection in the pores
thermal conduction of the inflating agent
thermal conduction of the polymer
thermal radiation.

Given the small pore diameters of 0.2 to 0.5 mm that are typical at present, convention plays no further role. The selection of the inflating agent should be made from the standpoint of low thermal conduction of the gas, among other factors.

The thermal conduction of the polymer can be reduced by reducing the proportion of the framework structure (in favor of the cell membrane). The radiation proportion can be advantageously varied by means of a smaller cell diameter.

At present, the rigid foams that insulate best are very fine-celled types with a high proportion of an inflating gas having a low coefficient of thermal conductivity in the cell.

In order to produce rigid foams, it is generally known to use chlorofluorocarbons (CFCs) as physical inflating agents. They have gained a special, widespread significance in the production of rigid foams based on polyurethane and polyisocyanurate, which are prepared by using polyols and isocyanates as starting materials.

From the standpoint of production technology, the use of CFCs is particularly distinguished by the fact that they are highly soluble in the polyols that are used. Their boiling range, which is above the typical temperatures in that kind of work, are in an advantageous relationship with the reaction temperatures occurring during the production. From the functional standpoint, the use of the CFCs is distinguished by the fact that they do not attack polyurethanes or polyisocyanurates.

The comparably poor thermal conduction property of CFCs also promotes a low heat transfer coefficient through the finished rigid foam.

The manifold, widespread use of rigid foams necessarily leads to the use of correspondingly large amounts of CFCs, but the chlorine components of the CFCs have proved to be extremely damaging to the environment when the rigid foams are finally disposed of, if not earlier. The consequences are well known.

There has therefore been no lack of attempts to produce and use rigid foams without involving CFCs, or at least using a reduced proportion of CFCs as an inflating agent.

An article by M. Mann and B. Phillips, entitled "FCKW-Blähmittel in Hartschaumstoffen" [CFC Inflating Agents in Rigid Foams]published in "Kunststoffe" [Plastics]79 (1989), pp. 328–333 illustrates the present state of the art and the problems involved in using substitute materials as inflating agents, such as partially halogenated hydrocarbons (HCFCs), instead of CFCs.

A process has also been disclosed for producing cellular plastics by the polyisocyanate polyaddition process, in which compounds that are poorly soluble or insoluble in the rigid foam raw materials are used as inflating agents, being emulsified in one of the rigid foam raw materials by the use of oligomeric acrylates.

In that case, inflating agents are used that have an advantage over the typically used CFC inflating agents, which is that they have no chlorine components. Accordingly, inflating agents that are not harmful to the ozone layer and thus make no further contribution to forming the ozone hole in the atmosphere, are used. However, even though they are excellently suitable for recycling on one hand, the natural breakdown of such inflating agents is very poor and slow, so that on the other hand, they contribute to the greenhouse effect for quite a long time in the atmosphere.

It is also known to expand rigid foams using a $CO_2$ inflating agent which is formed during the foaming process by the water component added to the polyol and the isocyanate, during the reaction of the isocyanate with the polyol. $CO_2$ gases are easily broken down in nature. In this sense they are relatively acceptable environmentally.

In accordance with current practice, the foams that are expanded with a $CO_2$ inflating agent have a disadvantageous distinction over the conventional rigid foams that are expanded with CFC inflating agents, which is that higher coefficients of thermal conductivity are attained. In order to achieve the same insulation effect, it would be necessary to increase the thickness of the rigid foam by approximately 30% or more. For thermally insulated appliances such as household appliances like refrigerators and freezers, this would mean that either the usable space on the inside would be reduced, or the outer dimensions of the appliances would have to be increased. In any case, the efficiency of the rigid foams that are expanded in the known manner with $CO_2$ inflating agents is substantially poorer than that of the rigid foams expanded in the known manner with CFC inflating agents. One essential reason for the poor insulating properties of rigid foams that are expanded with $CO_2$ inflating agents is the cell structure and cell size within the finished rigid foams. In rigid foams which are expanded with a $CO_2$ inflating agent, the known process has proved unable to decisively optimize the cell structure and cell size.

It is accordingly an object of the invention to provide a rigid foam and a process for producing the same, which overcome the hereinafore-mentioned disadvantages of the heretofore-known methods and products of this general type and to furnish a rigid foam, particularly a rigid foam based on polyurethane and polyisocyanurate, having a production which essentially uses $CO_2$ inflating agents that are formed in a known manner from the rigid foam raw material components during the reaction process thereof, instead of CFC inflating agents.

Ways are also to be found for homogenizing the cell structure within the rigid foam in particular, and for making the cell size smaller.

With the foregoing and other objects in view there is provided, in accordance with the invention, a rigid foam, in particular a largely closed-cell polyurethane or polyisocyanurate foam, comprising a cell structure being formed by the expansion of rigid foam raw materials, especially polyols and isocyanates, with carbon dioxide as an inflating agent, and optionally with the additional use of activators and/or stabilizers, the cell structure being substantially homogeneous and preferably having a cell size of less than 100 $\mu$m in diameter, and having a cell content of substantially $CO_2$ inflating agent and proportions of a physical inflating agent being at least substantially insoluble in at least one of the rigid foam raw materials.

It is therefore seen that a rigid foam has been discovered according to the invention, which meets the requirement mentioned above and is distinguished by having a substantially homogeneous cell structure with a cell size being preferably less than 100 $\mu$m in diameter and having a cell content of substantially $CO_2$ inflating agent and proportions of a physical inflating agent that is insoluble or poorly soluble, in other words practically insoluble, in at least one of the rigid foam raw materials being used.

In accordance with another feature of the invention, the cell size is between 50 $\mu$m and 80 $\mu$m, and the proportion by weight of the inflating agent that is insoluble or poorly soluble, in other words practically insoluble, in at least one of the rigid foam raw materials being used, is less than 2%, for instance approximately 1% of the rigid foam.

In accordance with a further feature of the invention, the inflating agent that is insoluble or poorly soluble, in other words practically insoluble, in at least one of the rigid foam raw materials being used, is a chemical compound selected from the group consisting of perfluorinated and substantially perfluorinated ether, or from the group consisting of perfluorinated and substantially perfluorinated hydrocarbons.

In accordance with an added feature of the invention, the inflating agents have a normal boiling point, or a boiling range which is preferably within a temperature range of from 20°-80° C.

In accordance with an additional feature of the invention, there is provided an emulsifier that nucleates the inflating agent that is insoluble or poorly soluble, in other words practically insoluble in the rigid foam raw material.

In accordance with yet another feature of the invention, there are provided inorganic emulsifiers, such as silica gel, while starch (amylum soluble) is a suitable organic emulsifier.

In accordance with yet a further feature of the invention, the proportion of the emulsifier is approximately 2% to 5% by weight of the inflating agent that is insoluble or poorly soluble, in other words practically insoluble in one of the rigid foam raw materials being used.

It has thus been discovered that it is not only possible to use inflating agents that are soluble in the rigid foam raw materials in order to produce rigid foams with advantageous properties as previously assumed, but that rigid foams having excellent utility are also achieved if they are prepared by using non-polar or practically non-polar and therefore insoluble or practically insoluble inflating agents, which are intensively mixed with one of the rigid foams, suitably with the addition of a physically effective emulsifier, to make a homogeneous emulsion.

It has also been found in attaining this object that the use of non-polar and practically non-polar physical inflating agents, under the conditions according to the invention, not only has advantages in terms of waste disposal, but the use of the inflating agents described with the use of an emulsifier, also permits the production of rigid foams having particularly advantageous properties, and in particular defined and thus extremely small cell size and as a result extremely low thermal conductivity. The aging stability is excellent both when solubilizers are used and when emulsifiers are used.

Therefore the subject of the invention is both rigid foams and processes for producing the same.

The rigid foams according to the invention are those that can be produced from conventional, known rigid foam raw materials using typical expansion techniques with the use of a physical inflating agent, with the addition of a chemical inflating agent as needed, and with the foams being made, for instance, on the basis of polyurethanes and polyisocyanurates.

The inflating agent which is suitable in an individual case should be selected from the range of available non-polar inflating agents, substantially from the standpoint of its compatibility with the emulsifier and its boiling point. It should be insoluble or practically insoluble in the rigid foam raw material. In other words, its solubility in the rigid foam raw material should be equal to zero or be slight enough to permit it to be introduced into the rigid foam raw material in a quantity required for performing an expansion by industrial processes, only by means of an emulsifier or solubilizer.

The use of non-polar fluorinated hydrocarbons, particularly fully fluorinated hydrocarbons, that are completely free of chlorine has proved to be particularly advantageous. One advantageous example thereof is perfluorpentane with the formula $C_5F_{12}$. The use of perfluorpentane has proved to be particularly advantageous especially because it has a boiling point of 28° C., which is within a boiling range of 20 to 60° C. that is particularly advantageous in industry.

Another physical inflating agent that can be used in accordance with the invention is perfluorhexane ($C_6F_{14}$), for instance, which has a boiling point of 57° C., that brings about a delayed foaming.

Perfluorinated or substantially perfluorinated ethers with a suitable boiling point or boiling range are also preferably usable as physical inflating agents. Optionally, mixtures of non-polar inflating agents of the type described with one another and/or with polar inflating agents, such as partially halogenated hydrocarbons, such as $CHCl_2CF_3$ (R 123) and $CH_3CCl_2F$ (R 141b), can be used. Up to 50% by volume of the non-polar inflating agent can, for instance, be replaced with polar inflating agent, without essentially impairing the advantageous functional properties of the rigid foam.

The physically acting emulsifiers which are suitable for producing a rigid foam according to the invention may be of either an inorganic or organic nature. Inorganic emulsifiers, which have proved to be particularly advantageous for producing a rigid foam according to the invention, include those based on $SiO_2$, in other words, silica gels, particularly those having particle sizes of from 2 $\mu$m to 25 $\mu$m and a pore diameter of from 60 to 100 Å. Such emulsifiers are available on the market, for example from Merck, under the trade name silica gel 60 or LiChrosorb Si60.

With the objects of the invention in view, there is also provided a process for producing a rigid foam, in particular a largely closed-cell polyurethane or polyisocyanurate foam, having a cell structure formed by the expansion of rigid foam raw materials, in particular polyols and isocyanates, with carbon dioxide, and optionally with the additional use of activators and/or stabilizers, which comprises forming a fine-celled rigid foam material by preparing an inflating agent being at least substantially insoluble in at least one of the rigid foam raw materials (in other words an inflating agent that is insoluble or poorly soluble and thus practically insoluble in the rigid foam raw material), homogeneously emulsifying the inflating agent in at least one of the rigid foam raw materials prior to the beginning of a chemical reaction, in the form of the disperse phase of an emulsion having a liquid droplet size of less than 10 $\mu$m in diameter and a proportion by weight of less than 3.5% of the rigid foam material, and selecting rigid foam raw materials including components for producing an essential required amount of inflating agent in the form of carbon dioxide.

In accordance with another mode of the invention, there is provided a process which comprises providing the disperse phase of the emulsion with a liquid droplet size of approximately 10 $\mu$m in diameter and a proportion by weight of approximately 2% of the rigid foam material.

In accordance with a further mode of the invention, there is provided a process which comprises providing the disperse phase of the emulsion with a liquid droplet size of approximately 4 $\mu$m in diameter and a proportion by weight of approximately 1% of the rigid foam material.

In accordance with a an added mode of the invention, there is provided a process which comprises forming the carbon dioxide during the foaming process in a known manner, for instance by means of water, which is added in the required manner to the polyol raw material component, and the isocyanate.

The small droplets originally present in the polyol as the disperse phase of an emulsion, that is droplets of the inflating agent that is introduced in relatively small quantities and is insoluble or poorly soluble or in other words practically insoluble in the polyol, act in a nucleating fashion upon the $CO_2$ gas produced during the foaming process and $CO_2$ gas production, in other words the inflating agent cells emulsified into the polyol for bubbles, into which the $CO_2$ gas diffuses.

If two parts by weight of insoluble inflating agent are emulsified into 100 parts by weight of polyol, to make a droplet size of approximately 4 $\mu$m in diameter, then 1 $cm^3$ of polyol contains approximately $9 \times 10^9$ droplets of inflating agent, each of one of which acts essentially equally upon the cell sizes and cell contents contained in the later $CO_2$ gas formation. The foam, which is essentially expanded by $CO_2$ gas, thus has a homogeneous, fine-pored cell structure.

In accordance with an additional mode of the invention, there is provided a process which comprises intensively and homogeneously incorporating the inflating agent that is insoluble or poorly soluble, that is practically insoluble, in one of the rigid foam materials being used, for instance in the polyol, into the inflating agent as a disperse phase of an emulsion, with the use of high shear forces and/or emulsifiers acting in a nucleating fashion upon the inflating agent, then intensively incorporating them into the rigid foam, that is the polyol, and subsequently initiating and performing the foaming process with the addition of the further rigid foam raw material, that is the isocyanate.

The ratio of the proportion by weight of polyol to water to isocyanate to insoluble inflating agent may be approximately 100:160:3:2 or 100:175:4:2 or the like. Increasing the proportion of insoluble inflating agent would improve the thermal insulation properties.

In accordance with yet another mode of the invention, there is provided a process which comprises using aliphatic and/or cyclic hydrocarbons or similar chlorine-free substances as an additional inflating agent being soluble in the rigid foam raw material components. In this way the thermal insulation property is improved, in particular in terms of aging behavior, since such inflating agents, like the insoluble or practically insoluble inflating agents, diffuse little if at all through the cell walls of the finished rigid foam and themselves have high thermal insulation properties.

In accordance with yet a further mode of the invention, there is provided a process which comprises adjusting the proportion of soluble inflating agents by weight so as not to exceed the proportion by weight of the insoluble or practically insoluble inflating agents in the rigid foam, in order to obtain the required fine-celled foam.

In accordance with a concomitant mode of the invention, there is provided a process which comprises initially mixing and dissolving the soluble inflating agent into the polyol raw material component, and subsequently intensively incorporating the insoluble or practically insoluble inflating agent into this solution in the homogeneous form of an emulsion.

According to the invention, a defined cell size can thus be attained, for instance by mixing a rigid foam raw material, such as the polyol, and the inflating agent and emulsifier to make an emulsion, in which the coherent phase includes the polyol and the disperse phase includes the inflating agent and emulsifier. The size of the inflating agent droplets can be specified through the selection of a suitable emulsifier (such as silica gel of a defined particle size and porosity). Upon mixing this emulsion with the isocyanate component, the latter mixes with the coherent phase without affecting the disperse phase. As a result of the heat of reaction, the boiling point of the inflating agent is exceeded, thus producing cells in which the gaseous inflating agent content is exactly equivalent to the liquid content of the droplets of the emulsion.

In the emulsification, expander droplets can be attained having a diameter of less than 20 μm. In the mixing of the polyol with the isocyanate, the droplets remain unchanged, for instance. Upon attaining the boiling point, each individual droplet of inflating agent changes to the gaseous state and forms a cell. With the inflating agents which are appropriate in this case, an increase in volume of 100 to 200 times is brought about as a result of the difference in the density of the inflating agent in the liquid and the gaseous states. It thus becomes possible to produce polyurethane rigid foams having a defined cell size of less than 0.1 mm, for example.

Since the rigid foam according to the invention is produced with the use of emulsifiers from an emulsion rather than from a solution of the inflating agent in the rigid foam raw material such as polyol, a very fine, uniform cell structure is attained. Due to the low coefficient of thermal conductivity of the inflating agent, polyurethane rigid foams can, for instance, be produced having a low thermal conductivity which almost approaches the values that are theoretically possible.

The composition of the cell gas is primarily definitive for the thermal conductivity of a rigid foam. The typical cell gas composition of a foam with trichlorofluormethane (R 11) expander, includes from 0 to 10% by volume of air, 20 to 30% by volume of $CO_2$, and 60 to 70% by volume of $CCl_3F$. With highly insulating rigid foams, the proportion of inflating agent is increased even further.

It has also been found that all of the CFCs and HCFCs known thus far react with the plastics that are used for backing sheets. In refrigerator construction, for instance, these are essentially impact-resistant polystyrenes (SRP) and acrylonitrile/butadiene/styrene (ABS).

In the case of trichlorofluormethane (R 11), for instance, resistant polystyrenes or types of ABS have had to be developed. HCFCs such as $CHCl_2CF_3$ (R 123) and $CH_3CCl_2F$ (R 141b) dissolve or expand SRP and ABS, so that novel plastics or resistant variants have had to be developed in this case.

By comparison, if an inert, non-polar fluorohydrocarbon is used, the existing materials can be used because no damage occurs.

Finally, it is known that the known rigid foams age over the course of time. The thermal conductivity increases, because air and sometimes moisture diffuse into the rigid foam and its cells, in fact relatively quickly, and the inflating agent gas diffuses out quite slowly. Accordingly, it is known to prevent aging by means of special diffusion-proof backing sheets, such as metal foils.

The typical plastics SRP and ABS are very highly effective diffusion barriers for the inflating agents used in accordance with the invention as well and cannot be attacked by them, so that the inflating agents are highly effectively prevented from escaping from the rigid foam, even over the long term. The polyurethane cell membranes themselves are also largely diffusion-proof and likewise cannot be attacked by the inflating agent according to the invention, so that the aging behavior is highly advantageous.

In the case of the conventional polyurethane rigid foams, for example, the rigid foam raw materials are incorporated into the foam molds in liquid form. It is only after a certain period of time (known as cream time), that the foam becomes cream-like. During this period, a housing must be very well sealed in order to prevent the liquid components from escaping.

A foam produced according to the invention, using a physically acting emulsifier, is cream-like immediately upon leaving the mixing head.

Typical suitable activators and stabilizers that can be used to produce the rigid foams according to the invention include tertiary amines and silicones, which are normally incorporated into the polyols.

Inorganic emulsifiers, which have proved to be particularly advantageous for producing a rigid foam according to the invention, include those based on $SiO_2$, in other words silica gels, particularly those having particle sizes from 2 μm to 25 μm and a pore diameter of 60 to 100 Å. Such emulsifiers are available on the market, for instance from the Merck company by the name of Silica Gel 60 or LiChrosorb Si60. The use of starch (amylum soluble) as an emulsifier has proved to be particularly advantageous if emulsifiers with very fine droplets are to be produced.

The rigid foams produced by the characteristics of the invention have similar thermal insulation properties to CFC-expanded rigid foams, with a reduced RL content, and based on polyol and isocyanate, as well as additional components such as may be used to produce CFC-foamed rigid foams, they can be prepared and processed with the same mixing and foaming equipment.

Other features which are considered as characteristic for the invention are set forth in the appended claims.

Although the invention is illustrated and described herein as embodied in a rigid foam and a process for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples that are intended to illustrate the invention in further detail.

For this purpose, the following were prepared:

Rigid foams according to the invention, using the following recipes (ppw=parts by weight of the components):

| | | Composition A |
|---|---|---|
| 5000 g = | 100 ppw | polyol, hydroxyl number: 370 ± 10; water content: 3.15% by weight |
| 8050 g = | 161 ppw | isocyanate MDI |
| 900 g = | 18 ppw | perfluoropentane ($C_5F_{12}$), boiling point 28° C. |
| 27 g = | 0.54 ppw | silica gel, particle size 5 μm, pore diameter 60Å |
| | | Composition B |
| 8000 g = | 100 ppw | polyol, hydroxyl number: 370 ± 10; water content: 3.15% by weight |
| 12880 g = | 161 ppw | isocyanate MDI |
| 1920 g = | 24 ppw | perfluoropentane ($C_5F_{12}$), boiling point 28° C. |
| 57.6 g = | 0.72 ppw | silica gel, particle size 5 to 10 μm, pore diameter 60Å |
| | | Composition C |
| 5000 g = | 100 ppw | polyol, hydroxyl number: 450 ± 15; |

-continued

|  |  |  |
|---|---|---|
| 120 g = | 2.4 ppw | water-free water |
| 7700 g = | 154 ppw | isocyanate MDI |
| 1800 g = | 36 ppw | perfluoropentane ($C_5F_{12}$), boiling point 28° C. |
| 54 g = | 1.08 ppw | silica gel, particle size 2 to 25 μm, pore diameter 60Å |
| Composition D |  |  |
| 5000 g = | 100 ppw | polyol, hydroxyl number: 370 q ± 10; water content: 3.15% by weight |
| 8050 g = | 161 ppw | isocyanate MDI |
| 1300 g = | 26 ppw | perfluoropentane ($C_5F_{12}$), boiling point 28° C. |
| 39 g = | 0.78 ppw | silica gel, particle size 2 to 25 μm, pore diameter 60Å |
| Composition E |  |  |
|  | 100 ppw | polyol, hydroxyl number: 370 q ± 10; water content: 3.15% by weight |
|  | 161 ppw | isocyanate MDI |
|  | 25 ppw | perfluoropentane ($C_5F_{12}$), boiling point 28° C. |
|  | 0.75 ppw | silica gel, particle size 2 to 25 μm, pore diameter 60Å |
| Composition F |  |  |
|  | 100 ppw | polyol, hydroxyl number: 370 q ± 10; water content: 3.15% by weight |
|  | 161 ppw | isocyanate MDI |
|  | 25 ppw | perfluoropentane ($C_5F_{12}$), boiling point 28° C. |
|  | 1 ppw | starch (amylum soluble) |
| Composition G |  |  |
|  | 100 ppw | polyol, hydroxyl number: 370 q ± 10; water content: 3.15% by weight |
|  | 161 ppw | isocyanate MDI |
|  | 15 ppw | perfluoropentane ($C_5F_{12}$), boiling point 28° C. |
|  | 0.45 ppw | silica gel, particle size 5 μm, pore diameter 60Å |
| Composition H |  |  |
|  | 100 ppw | polyol, hydroxyl number: 370 q ± 10; water content: 3.15% by weight |
|  | 161 ppw | isocyanate MDI |
|  | 12.5 ppw | perfluoropentane ($C_5F_{12}$), boiling point 28° C. |
|  | 12.5 ppw | CFC R 123 ($CHCl_2CF_3$), boiling point 28.7° C. |
|  | 0.75 ppw | silica gel, particle size 2 to 25 μm, pore diameter 60Å | and rigid foams according to the prior art for comparison purposes, using the following recipe composition:

|  |  |  |
|---|---|---|
| Composition R |  |  |
| 100 ppw | polyol, hydroxyl number: 370 q ± 10; water content: 3.15% by weight |  |
| 161 ppw | isocyanate MDI |  |
| 18 ppw | trichlorofluormethane (R 11) |  |
| Composition S |  |  |
| 100 ppw | polyol, hydroxyl number: 450 ± 15; water content: 1.8% by weight |  |
| 154 ppw | isocyanate MDI |  |
| 36 ppw | trichlorofluormethane (R 11) |  |
| Composition T |  |  |
| 100 ppw | polyol, hydroxyl number: 300 q ± 10; water content: 3.8% by weight |  |
| 161 ppw | isocyanate MDI no inflating agents |  |

The following are, for instance, obtainable: polyol with the hydroxyl number 370 q±10 and a water content of 3.15% from Dow under the name Voractec SD 110; polyol with the hydroxyl number 450±15 from Dow by the name of Voratec SD 107; isocyanate MDI from Bayer AG under the name Desmodur 44v20.

EXAMPLE 1

With the three different compositions A, B and C, each including a polyol, an isocyanate, an inflating agent and an emulsifier, the procedure was performed in such a way that first the inflating agent was mixed with the emulsifier, and then the mixture was stirred together with the polyol. The emulsion obtained in this way was foamed together with the isocyanate in a foam making machine of the type HK 245, made by the Hennecke company. Slabs were cut from the rigid foams obtained to a size of 18×18—3 cm³, and tested.

The data summarized in Table 1 below were obtained:

TABLE 1

| Properties | Compositions | | |
|---|---|---|---|
|  | A | B | C |
| Coefficient of thermal conductivity CTC (mW/K · m) | 19.1 | 18.5 | 17.3 |
| Raw density (kg/m³) | 40 | 36.8 | 36.5 |
| Pressure resistance (N/cm²) | 18.6 | 16.8 | 13.4 |
| Closed cells in percent | — | 94 | 94 |

It can be inferred from the data obtained that the thermal conductivity decreases, as desired, with an increasing proportion of inflating agent. The other technological values are approximately equivalent to the polyurethane rigid foam presently used.

EXAMPLE 2

Slabs 18×18×3 cm³ in size from the compositions A and B were subjected to an aging test, in which they were stored in a hot cabinet at 60° C. For comparison purposes, slabs of the same size that were made from known rigid foams according to composition R and cut to size were subjected to the same test. Of the slabs stored, the coefficient of thermal conductivity (CTC) was measured at time intervals (days). The results obtained are summarized in the following Table 2.

TABLE 2

Coefficients of thermal conductivity (CTC) in mW/K m during the test period

| Rigid foam according to the invention, per composition A and composition B | | |
|---|---|---|
| Days | Composition A | Composition B |
| 0 | 19.7 | 18.5 |
| 3 | 20.9 | 19.8 |
| 5 | 21.1 | 20.1 |
| 7 | 21.5 | 20.9 |
| 10 | 22.3 | 21.4 |
| 13 | 22.8 | 21.9 |
| 17 | 23.3 | 22.1 |
| 20 | 23.5 | 22.3 |
| 24 | 23.5 | 22.4 |
| 27 | 23.7 | 22.9 |
| 52 | 24.1 | 23.1 |

| Rigid foam according to the prior art, per composition R | | | | |
|---|---|---|---|---|
| Days | Slab 1 | Slab 2 | Slab 3 | φ |
| 0 | 19.0 | 18.9 | 19.1 | 19.0 |
| 3 | 21.0 | 22.8 | 20.8 | 21.5 |
| 6 | 22.4 | 23.0 | 23.2 | 22.9 |
| 10 | 24.1 | 25.5 | 23.8 | 24.5 |
| 13 | 24.7 | 24.3 | 24.1 | 24.4 |
| 20 | 24.8 | 26.5 | 24.9 | 25.4 |
| 28 | 25.5 | 24.9 | 25.0 | 25.1 |
| 44 | 26.2 | 26.1 | 25.8 | 26.0 | it can be seen from the data obtained that the CTC values of the rigid foams according to the invention are lower than the CTC values of the rigid foam prepared by the prior art, with a 50% reduction in R 11 content.

EXAMPLE 3

Based on composition D, further rigid foam slabs were produced in a size of 18×18×3 cm³ and subjected to an aging test at 90° C. For comparison purposes, corresponding slabs were also tested that were cut from rigid foams made by composition R obtained with trichlorofluormethane (R 11). The result obtained are summarized in Table 3.

TABLE 3

Coefficients of thermal conductivity (CTC) in mW/K m during the test period

Rigid foam according to the invention, per composition D

| Days | Slab 1 | Slab 2 | Slab 3 | Slab 4 | φ |
|------|--------|--------|--------|--------|------|
| 0    |        |        |        |        | 19.4 |
| 3    | 21.4   | 22.3   | 21.4   | 21.7   | 21.7 |
| 6    | 22.4   | 23.1   | 22.3   | 22.5   | 22.5 |
| 10   | 22.8   | 23.6   | 22.8   | 23.1   | 23.1 |
| 14   | 22.9   | 23.4   | 22.7   | 23.0   | 23.0 |
| 17   | 22.9   | 23.6   | 22.8   | 23.0   | 23.1 |
| 20   | 23.1   | 23.7   | 23.1   | 23.2   | 23.3 |
| 47   | 23.1   | 23.7   | 23.1   | 23.3   | 23.3 |
| 53   | 23.3   | 23.8   | 23.1   | 23.3   | 23.4 |

Rigid foam according to the prior art, per composition R

| Days | Slab 1 | Slab 2 | Slab 3 | φ |
|------|--------|--------|--------|------|
| 0    |        |        |        | 18.9 |
| 3    | 22.3   | 22.9   | 24.5   | 23.2 |
| 6    | 23.6   | 23.2   | 24.8   | 23.8 |
| 13   | 24.5   | 24.8   | 24.7   | 24.7 |
| 17   | 25.1   | 25.0   | 26.6   | 25.5 |
| 20   | 24.9   | 26.1   | 24.9   | 25.3 |

It is apparent from the data obtained that the CTC values the foam according to the invention, upon reaching the final state, are lower than the CTC values of the rigid foam of the prior art.

EXAMPLE 4

This example shows that a rigid foam according to the invention has the further advantage of a lower capacity for absorbing water.

Various cubes of rigid foam 3×3×3 cm³ in size were stored for several weeks in water at 90° C. At intervals, the water absorption was ascertained in percent by volume. The rigid foam cubes were based on the following recipes of the prior art in accordance with compositions R, S, T and by the invention in accordance with composition B.

The measured values obtained are summarized in Table 4 below.

TABLE 4

Water absorption of rigid foam cubes in percent by volume during the test interval

| Weeks | Composition R | Composition S | Composition T | Composition B |
|-------|---------------|---------------|---------------|---------------|
| 0     | 0    | 0    | 0    | 0    |
| 1     | 6.1  | 7.2  | 7.4  | 5.9  |
| 2     | 12.6 | 12.1 | 12.2 | 9.4  |
| 3     | 14.1 | 14.5 | 13.6 | 10.8 |
| 4     |      |      | 18.0 | 11.1 |
| 5     |      |      | 15.1 |      |
| 6     | 17.6 | 15.4 | 17.4 |      |
| 7     | 20.5 | 18.9 | 19.3 |      |
| 8     | 23.2 | 21.4 |      | 13.6 |
| 9     | 21.7 | 19.9 |      |      |
| 10    | 24.2 | 23.6 |      |      |
| 11    | 28.5 | 24.3 |      |      |

Once again it was demonstrated that the rigid foam according to the invention has hydrolysis resistance equal to that of good rigid foams made in the prior art, as can also be proven by a pressure resistance test summarized in Table 5.

TABLE 5

Pressure resistance values of rigid foam cubes in N/cm³ during the test period

| Weeks | Composition R | Composition S | Composition T | Composition B |
|-------|---------------|---------------|---------------|---------------|
| 0  | 12.6 | 13.3 | 20.6 | 19.2 |
| 1  | 7.1  | 7.3  | 11.2 | 14.6 |
| 2  | 5.7  | 8.1  | 15.6 | 11.6 |
| 3  | 7.4  | 8.1  | 15.9 | 9.5  |
| 4  |      |      | 18.3 | 13.9 |
| 5  |      |      | 14.0 |      |
| 6  | 8.6  | 7.5  | 13.6 |      |
| 7  | 7.7  | 6.3  | 21.2 |      |
| 8  | 10.8 | 8.0  | 12.1 |      |
| 9  | 6.3  | 7.1  |      |      |
| 10 | 8.6  | 7.2  |      |      |
| 11 | 8.1  | 6.2  |      |      |

EXAMPLE 5

This example shows that with the method of the invention, rigid foams usable particularly as insulating foams and having a defined small cell size that is below the cell size of rigid foam expanded conventionally with CFC can be produced, depending on the emulsifier used and its particle size.

Compositions E, F and G according to the invention and one composition R of the prior art were foamed.

Rigid foams according to the invention in compositions E, F and G and of the prior art using composition R were tested for the cell diameter attained. The mean cell diameters ascertained of the rigid foams are summarized in Table 6, below.

TABLE 6

Mean cell diameter of rigid foams in mm

| Compositions   | E    | F     | G    | R    |
|----------------|------|-------|------|------|
| Cell diameter  | 0.17 | 0.085 | 0.12 | 0.25 |

EXAMPLE 6

This example shows that the rigid foam according to the invention is excellent for use as insulating foam in refrigerators.

With composition B, two refrigerators of the type KIL 1600 were foamed. The heat transfer coefficients of the refrigerators (k A values [W/K]) were ascertained. For comparison purposes, the applicable values were measured for refrigerators that were insulated with two different rigid foams. These other two rigid foams were based on recipes of composition R and composition S.

The measured values obtained are summarized in the following Table 7.

TABLE 7

Heat transfer coefficients (k A values [W/K]) of foamed refrigerators

| Composition B | Composition R | Composition S |
|---------------|---------------|---------------|
| 1.545/1.530   | 1.608         | 1.569         |

The values ascertained confirm the advantageous low heat conduction of the rigid foams according to the invention.

EXAMPLE 7

In order to economize on non-polar expander, in some cases it may be practical to work with mixtures of a non-polar inflating agent used in accordance with the invention and a conventional polar inflating agent. In this case as well, advantageous rigid foams can be produced.

Starting with composition H, a fine-pored foam was obtained that could be processed into rigid foam slabs of excellent properties.

Correspondingly favorable results were then obtained by working with small proportions of $CHCl_2CF_3$ (R 123).

Depending on the other given conditions and intended uses, the production of rigid foam was carried out with added water. The water content improves the flowability of the foam that forms and is distributed in the molds during the production of the rigid foams, so that even complicated molds are well filled out. On other hand, however, the water content lessens the good thermal insulation properties of the finished rigid foam.

Other examples of recipe compositions with a reduced content of inflating agents that are insoluble or practically insoluble in the polyol raw material component are given below, and the primary components used that are relevant according to the invention are shown in parts per weight (ppw).

| Recipe composition A | | |
|---|---|---|
| 100 ppw | polyol, hydroxyl number: 370 q ± 10; water content 3.15% by weight | |
| 2 ppw | perfluorinated ether | |
| 160 ppw | isocyanate MDI | |

The perfluorinated ether was mixed intensively with the polyol, using high shear forces, to make a homogeneous emulsion, producing an emulsion with the perfluorinated ether as a disperse phase. The droplet size of the perfluorinated ether was less than 20 μm. Following that, the foaming process was initiated and performed in the manner known from CFC processes, by addition of the isocyanate.

The result was a fine-pored homogeneous rigid foam having a thermal conductivity coefficient of 21 mW/Km.

| Recipe composition B | |
|---|---|
| 100 ppw | polyol, hydroxyl number: 370 q ± 10; water content 3.15% by weight |
| 1 ppw | water |
| 2 ppw | perfluorinated ether |
| 0.46 ppw | starch (amylum soluble) |
| 176 ppw | isocyanate MDI |

The water was dissolved in polyol and the starch was mixed into the perfluorinated ether. Then the perfluorinated ether was mixed intensively with the polyol, using high shear forces, to make a homogeneous emulsion, producing an emulsion with the perfluorinated ether as a disperse phase. The droplet size of the perfluorinated ether was less than 20 μm. Subsequently, through addition of the isocyanate, the foaming process was initiated and performed in the manner known from CFC processes.

The result was a fine-pored homogeneous rigid foam having a thermal conductivity coefficient of 21 mW/Km.

| Recipe composition C | |
|---|---|
| 100 ppw | polyol, hydroxyl number: 370 q ± 10; water content 3.15% by weight |
| 1 ppw | water |
| 2 ppw | perfluorinated pentane |
| 0.04 ppw | starch |
| 176 ppw | isocyanate MDI |

The procedure was the same as in B, except that instead of perfluorinated ether, perfluorinated pentane was used, which had a favorable effect on the thermal insulation property. The result was a fine-pored homogeneous foam having a thermal conductivity coefficient of 20.5 mW/Km.

| Recipe composition D | |
|---|---|
| 100 ppw | polyol, hydroxyl number: 370 q ± 10; water content 3.15% by weight |
| 1 ppw | water |
| 4 ppw | perfluorinated pentane |
| 0.25 ppw | starch |
| 176 ppw | isocyanate MDI |

The procedure was the same as in C, except that instead of perfluorinated ether, perfluorinated pentane was used but in an increased amount and with an additionally increased emulsifier proportion. The thermal insulation property was even further improved.

The result was a fine-pored homogeneous foam having a thermal conductivity coefficient of under 20 W/Km.

The following chemicals are available, as examples: polyol with the hydroxyl number 370 q ± 10 and a water content of 3.15% from Dow, by the name XZ95-487; perfluorinated ether from Montefluos under the name Galden EX 70 (the boiling range of this perfluorinated ether is between 45 and 73.C); isocyanate MDI from Bayer AG under the name Desmodur 44v20.

Examples with an additional use of soluble inflating agents are listed below, and the primary components are given in parts per weight (ppw).

| Recipe composition A | |
|---|---|
| 100 ppw | polyol, hydroxyl number: 307.0; water content: 3.4% |
| 6 ppw | perfluorinated ether (polyoxyperfluoralkane) |
| 3 ppw | cyclopentane |
| 3 ppw | cyclohexane |
| 148 ppw | isocyanate MDI |

The cyclopentane and cyclohexane components are first dissolved slowly in the polyol with an agitator (rotating at 200 rpm) and after the addition of perfluorinated ether they are mixed, using high shear forces (agitator at 2000 rpm), to make a homogeneous emulsion. Then, by addition of the isocyanate, the foaming process was initiated and performed.

A fine-celled homogeneous rigid foam with a thermal conductivity coefficient of 19.6 mW/Km was produced.

| Recipe composition B | |
| --- | --- |
| 100 ppw | polyol, hydroxyl number: 307; water content: 3.4% |
| 9 ppw | perfluorinated ether |
| 3 ppw | cyclopentane |
| 3 ppw | cyclohexane |
| 148 ppw | isocyanate MDI |

The procedure is the same as in recipe composition A. A fine-celled homogeneous rigid foam with a thermal conductivity coefficient of 19.4 mW/Km was produced.

| Recipe composition C | |
| --- | --- |
| 100 ppw | polyol, hydroxyl number: 307; water content: 3.4% |
| 6 ppw | perfluor-2-methyl pentane |
| 3 ppw | cyclopentane |
| 3 ppw | cyclohexane |
| 148 ppw | isocyanate MDI |

The procedure is the same as in recipe composition A. A fine-celled homogeneous rigid foam was produced.

| Recipe composition D | |
| --- | --- |
| 100 ppw | polyol, hydroxyl number: 307; water content: 3.4% |
| 6 ppw | perfluorohexane |
| 3 ppw | cyclopentane |
| 3 ppw | cyclohexane |
| 148 ppw | isocyanate MDI |

The procedure is the same as in recipe composition A. A fine-celled homogeneous rigid foam was produced.

Through the additional use of physical emulsions, as given in the earlier examples, the fineness of the porosity of the rigid foam is even further improved.

The construction and method of operation of the invention and additional objects and advantages will also be better understood from the following description of specific embodiments when read in connection with the accompanying drawings which illustrate exemplary embodiments of mixing possibilities for the mechanical preparation of emulsions from at least one rigid foam raw material and a non-polar or practically non-polar inflating agent for the purpose of ri foam preparation.

Figure 1:
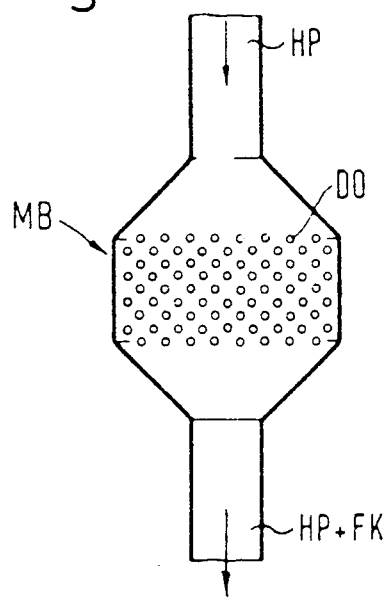
FIGS. 1-4 are fragmentary, diagrammatic, cross-sectional views showing three different apparatus with which emulsions of a rigid foam raw material or two rigid foam raw materials, on one hand as the coherent phase, and an inflating agent, on the other as the disperse phase, can be produced as the basis for the production of a rigid foam.
Figure 2:
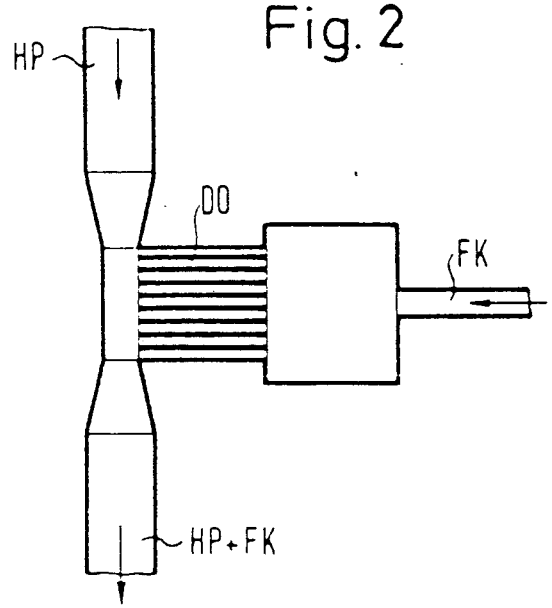

Referring now to the figures of the drawings in detail and first, particularly, to FIGS. 1 and 2 thereof, there is seen a configuration in which polyol HP is delivered in the direction of the arrow to a mixing zone MB of an apparatus, as one of the rigid foam raw materials. Terminating in the mixing zone MB are nozzle openings DO, through which a fluorinated hydrocarbon FK is finely distributed under pressure as an inflating agent and introduced in the form of small droplets having a diameter of less than 20 μm. The nozzle openings DO act like a shower head, and the droplet shaping and distribution can be achieved with the aid of an apparatus that may be adapted to the present conditions, and is constructed identically to and functions like ink jet dot-matrix printers. The delivery pressure of the fluorinated hydrocarbon FK must be far enough above the delivery pressure of the polyol HP, to ensure that the polyol is adequately penetrated by the droplets of fluorinated hydrocarbon.

After the mixing zone MB, an emulsion of polyol HP as the coherent phase and fluorinated hydrocarbon FK as the disperse phase reaches the apparatus in the direction of a further mixing head, in which this emulsion HP+FK is mixed with isocyanate.

Immediately after that the chemical reaction begins, a foaming process and subsequently a hardening process takes place to prepare the rigid foam in a known manner.

Figure 3:
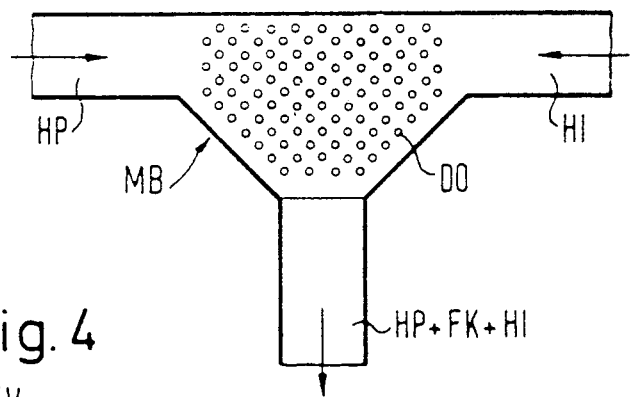

In the configuration shown in FIG. 3, polyol HP and isocyanate HI are introduced into the mixing zone MB, in which the nozzle openings DO for introducing fluorinated hydrocarbons FK terminate. In this mixing zone MB, the polyol, isocyanate, and fluorinated hydrocarbon are combined, forming an emulsion. The emulsion leaves the mixing zone MB ready for reaction, that is the inflation process and the hardening process ensue in close chronological succession.

Figure 4:
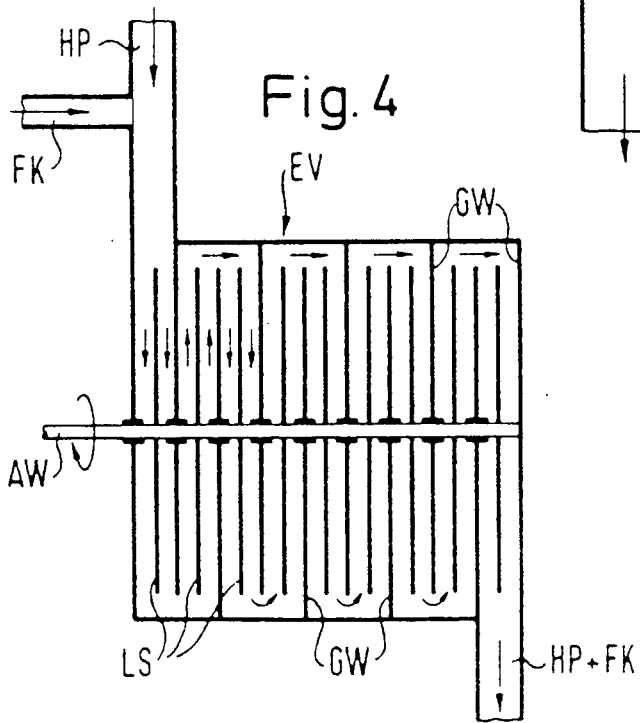

In the configuration shown in the basic diagram of FIG. 4, polyol HP and fluorinated hydrocarbon FK are supplied through delivery conduits in the direction of an arrow to an emulsifier apparatus EV and pass through meandering narrow guide regions of the emulsifier apparatus EV. These meandering guide regions are formed by fixed housing walls GW of the emulsifier apparatus EV, between which lamination-like disks LS that are secured in common on a shaft AW and driven in rotation thereby, are disposed. The mixture of polyol HP and fluorinated hydrocarbon FK passes between the rotating lamination-like disks LS and the housing walls GW, and the substantial structure thereof is subjected to very high shear forces due to the relative motion to which the mixture is exposed between the correspondingly fast-rotating disks LS and the fixed housing walls GW, so that a homogeneous emulsion having a very small droplet size in the disperse phase is produced, which then leaves the emulsifier apparatus EV in the direction of the arrow, upon which it is delivered in turn to a known mixer in which the isocyanate is added.

Through the use of gas chromatographic measurement and comparison of the absolute and relative retention times, the suitability of unpolarized or essentially unpolarized inflating agents and therefore that they are insoluble or practically insoluble in at least one of the rigid foam materials, for instance in polyol, can be very well predetermined or confirmed.

Retention time is the time needed by the respective inflating agent which is added to an inert material to pass through a measuring path or section containing a reference material, while the feed velocity is kept constant.

The measuring path which is provided may, for example, be a steel pipe with a length of 3600mm and a diameter of 1.8mm, that is filled with a grainy carrier material of Chromosorb or Supelcoport (e.g. aluminum silicate), to which 4% polypropylene glycol (Ucon LB 550X) is added. At a constant temperature of 40° C, helium is blown into the measuring path as an inert gas with a flow-through quantity of 20 ml/min. The inflating agent to be measured is fed into the helium current through a dosage point and is transported through the measuring path therewith.

The inflating agent is thereby repeatedly absorbed and desorbed by the polypropylene glycol. The period of time in the measuring path is determined as a retention time tms (in seconds). A capacity factor K' for the inflating agent can be calculated from this with the formula:

$$K' = \frac{tms - tm}{tm}$$

where tm = 86 seconds, the retention time of air.

When this calculated value is compared with the corresponding value of n-pentane as a reference value for a polar material, this gives a relative measure of polarity.

The following values were thus determined, wherein Kp shows the boiling point of the respective inflating agent in °C:

| Inflating agent | Kp | tms | K' | K'(Comparison) / K'(n-Pentane) |
|---|---|---|---|---|
| $C_5F_{12}$ | 28 | 89 | 0.0349 | 0.0184 |
| $C_6F_{12}$ | 48-52 | 93 | 0.0814 | 0.0429 |
| $C_6F_{14}$ | 57.3 | 93 | 0.0814 | 0.0429 |
| $CF_3(OC_3F_6)$ | 45-73 | 98 | 0.1395 | 0.0736 |
| $C_6F_{12}H_2$ | 66.5 | 134 | 0.5581 | 0.2945 |
|  | 66.8 | 149 | 0.7325 | 0.3865 |
|  | 67.3 | 168 | 0.9534 | 0.5030 |
| $C_6F_{13}H$ | 67 | 181 | 1.1046 | 0.5828 |
| $C_5H_{12}$ | 36.2 | 249 | 1.8953 | 1.0000 |
| $CCl_3F$ | 24 | 290 | 2.3720 | 1.2515 |

$C_5H_{12}$ is n-pentane used as a reference material and $CCl_3F$ is a customarily used chlorinated hydrocarbon.

We claim:

1. Rigid foam, comprising a cell structure being formed by the expansion of rigid foam raw materials with carbon dioxide as an inflating agent, said cell structure being substantially homogeneous and having a cell content of substantially $CO_2$ inflating agent and proportions of a physical inflating agent being at least substantially insoluble in at least one of the rigid foam raw materials.

2. Rigid foam according to claim 1, wherein the rigid foam raw materials are selected from the group consisting of polyols and isocyanates.

3. Rigid foam according to claim 1, wherein at least one of activators and stabilizers are additionally used to form said cell structure.

4. Rigid foam according to claim 1, wherein said cell structure has a cell size of less than 100 μm in diameter.

5. Rigid foam according to claim 1, wherein said cell structure has a cell size of between 50 μm and 80 μm in diameter.

6. Rigid foam according to claim 1, wherein the proportion by weight of said inflating agent being at least substantially insoluble in at least one of the rigid foam raw materials, is less than 3.5% of the rigid foam.

7. Rigid foam according to claim 1, wherein the proportion by weight of said inflating agent being at least substantially insoluble in at least one of the rigid foam raw materials, is less than 2% of the rigid foam.

8. Rigid foam according to claim 1, wherein the proportion by weight of said inflating agent being at least substantially insoluble in at least one of the rigid foam raw materials, is approximately 1% of the rigid foam.

9. Rigid foam according to claim 1, wherein said inflating agent being at least substantially insoluble in at least one of the rigid foam raw materials is selected from the group consisting of perfluorinated and substantially perfluorinated ethers.

10. Rigid foam according to claim 1, wherein said inflating agent being at least substantially insoluble in at least one of the rigid foam raw materials is selected from the group consisting of perfluorinated and substantially perfluorinated hydrocarbons.

11. Rigid foam according to claim 1, wherein said inflating agent being at least substantially insoluble in at least one of the rigid foam raw materials has a normal boiling point range within a temperature range of substantially between 20° and 80° C.

12. Rigid foam according to claims 1, wherein said inflating agent being at least substantially insoluble in at least one of the rigid foam raw materials is selected from the group consisting of perfluorinated and substantially perfluorinated pentane ($C_5F_{12}$).

13. Rigid foam according to claims 1, wherein said inflating agent being at least substantially insoluble in at least one of the rigid foam raw materials is selected from the group consisting of perfluorinated and substantially perfluorinated hexane ($C_6F_{14}$).

14. Rigid foam according to claim 1, including at least one inflating agent being soluble in the rigid foam raw materials and having a proportion by weight at most equal to the proportion by weight of said inflating agent being at least substantially insoluble in at least one of the rigid foam raw materials.

15. Rigid foam according to claim 14, wherein said inflating agent being soluble in the rigid foam raw material is an aliphatic hydrocarbon.

16. Rigid foam according to claim 15, wherein said inflating agent being soluble in the rigid foam raw material is at least one of the materials selected from the group consisting of n-pentane and n-hexane.

17. Rigid foam according to claim 14, wherein said inflating agent being soluble in the rigid foam raw material is a cyclic hydrocarbon.

18. Rigid foam according to claim 17, wherein said inflating agent being soluble in the rigid foam raw material is at least one of the materials selected from the group consisting of cyclopentane and cyclohexane.

19. Rigid foam according to claim 1, including emulsifiers having a nucleating effect on said inflating agents being at least substantially insoluble in at least one of the rigid foam raw materials.

20. Rigid foam according to claim 19, including an inorganic emulsifier.

21. Rigid foam according to claim 20, including silica gel.

22. Rigid foam according to claim 19, including an organic emulsifier.

23. Rigid foam according to claim 22, including starch (amylum soluble).

24. Rigid foam according to claim 19, wherein the proportion of emulsifier is approximately 2% of the proportion by weight of said inflating agent being at least substantially insoluble in at least one of the rigid foam raw materials.

25. Rigid foam according to claim 20, wherein the proportion of emulsifier is approximately 2% of the proportion by weight of said inflating agent being at least substantially insoluble in at least one of the rigid foam raw materials.

26. Rigid foam according to claim 22, wherein the proportion of emulsifier is approximately 2% of the proportion by weight of said inflating agent being at least substantially insoluble in at least one of the rigid foam raw materials.

27. Largely closed-cell polyurethane or polyisocyanurate rigid foam, comprising a cell structure being formed by the expansion of rigid foam raw materials with carbon dioxide as an inflating agent, said cell structure being substantially homogeneous and having a cell content of substantially $CO_2$ inflating agent and proportions of a physical inflating agent being at least substantially insoluble in at least one of the rigid foam raw materials.

28. Rigid foam according to claim 27, wherein the rigid foam raw materials are selected from the group consisting of polyols and isocyanates.

29. Rigid foam according to claim 27, wherein at least one of activators and stabilizers are additionally used to form said cell structure.

30. Rigid foam according to claim 27, wherein said cell structure has a cell size of less than 100 μm in diameter.

31. Process for producing a rigid foam having a cell structure formed by the expansion of rigid foam raw materials with carbon dioxide, which comprises forming a fine-celled rigid foam material by preparing an inflating agent being at least substantially insoluble in at least one of the rigid foam raw materials, homogeneously emulsifying the inflating agent in at least one of the rigid foam raw materials prior to the beginning of a chemical reaction, in the form of the disperse phase of an emulsion having a liquid droplet size at most equal to 10 μm in diameter and a proportion by weight of less than 3.5% of the rigid foam material, and selecting rigid foam raw materials including components for producing an essential required amount of inflating agent in the form of carbon dioxide.

32. Process according to claim 31, which comprises forming the cell structure by expansion of the rigid foam raw materials selected from the group consisting of polyols and isocyanates.

33. Process according to claim 31, which comprises additionally using at least one of activators and stabilizers to form the cell structure.

34. Process according to claim 31, which comprises providing the disperse phase of the emulsion with a liquid droplet size of less than 10 μm in diameter and a proportion by weight of less than 3.5% of the rigid foam material.

35. Process according to claim 31, which comprises providing the disperse phase of the emulsion with a liquid droplet size of approximately 10 μm in diameter and a proportion by weight of approximately 2% of the rigid foam material.

36. Process according to claim 31, which comprises providing the disperse phase of the emulsion with a liquid droplet size of approximately 4 μm in diameter and a proportion by weight of approximately 1% of the rigid foam material.

37. Process according to claim 32, which comprises enriching the polyol raw material with a required quantity of water for forming carbon dioxide during the expansion process.

38. Process according to claim 37, which comprises adjusting a proportion by weight of a water content to from 2-6% of the polyol.

39. Process according to claim 31, which comprises incorporating the inflating agent being at least substantially insoluble in at least one of the rigid foam raw materials as a disperse phase of an emulsion utilizing high shear forces, in the rigid foam material in which the inflating agent is at least substantially insoluble.

40. Process according to claim 31, which comprises incorporating and dissolving an inflating agent being soluble in the rigid foam raw materials into the rigid foam raw materials, and adjusting proportions by weight of the soluble inflating agent to be at most equal to proportions by weight of the inflating agent being at least substantially insoluble in at least one of the rigid foam raw materials.

41. Process according to claim 40, which comprises carrying out the step of incorporating the inflating agent being soluble in the rigid foam raw material prior to incorporating the inflating agent being at least substantially insoluble in at least one of the rigid foam raw materials into the rigid foam raw material, and forming a solution therewith.

42. Process according to claim 31, which comprises selecting the inflating agent being at least substantially insoluble in at least one of the rigid foam raw materials from the group consisting of perfluorinated and substantially perfluorinated ethers.

43. Process according to claim 31, which comprises selecting the inflating agent being at least substantially insoluble in at least one of the rigid foam raw materials from the group consisting of perfluorinated and substantially perfluorinated hydrocarbons.

44. Process according to claim 31, which comprises adjusting the boiling range of the inflating agent being at least substantially insoluble in at least one of the rigid foam raw materials to a temperature range substantially between 20° and 80° C.

45. Process according to claim 31, which comprises selecting the inflating agent being at least substantially insoluble in at least one of the rigid foam raw materials from the group consisting of perfluorinated and substantially perfluorinated pentane ($C_5F_{12}$).

46. Process according to claim 31, which comprises selecting the inflating agent being at least substantially insoluble in at least one of the rigid foam raw materials from the group consisting of perfluorinated and substantially perfluorinated hexane ($C_6F_{14}$).

47. Process according to claim 31, which comprises adding at least one inflating agent being soluble in the rigid foam raw materials in a proportion by weight being at most equal to the proportion by weight of the inflating agent being at least substantially insoluble in at least one of the rigid foam raw materials.

48. Process according to claim 47, which comprises selecting the inflating agent being soluble in the rigid foam raw material as an aliphatic hydrocarbon.

49. Process according to claim 48, which comprises selecting the inflating agent being soluble in the rigid foam raw material as at least one material from the group consisting of n-pentane and n-hexane.

50. Process according to claim 47, which comprises selecting the inflating agent being soluble in the rigid foam raw material as a cyclic hydrocarbon.

51. Process according to claim 50, which comprises selecting the inflating agent being soluble in the rigid foam raw material as at least one material from the group consisting of cyclopentane and cyclohexane.

52. Process according to claim 31, which comprises incorporating the inflating agent being at least substantially insoluble in at least one of the rigid foam raw materials as a disperse phase of an emulsion, utilizing an emulsifier acting in a nucleating fashion upon the inflating agent in the rigid foam material in which the inflating agent is at least substantially insoluble.

53. Process according to claim 52, which comprises initially mixing the inflating agent being at substantially insoluble in at least one of the rigid foam raw materials with the emulsifier acting in a nucleating fashion upon the inflating agent, and subsequently incorporating the inflating agent being at substantially insoluble in at least one of the rigid foam raw materials into the rigid foam raw material in which the inflating agent is at least substantially insoluble.

54. Process according to claim 52, which comprises selecting the emulsifier as an inorganic emulsifier acting in a nucleating fashion upon the inflating agent.

55. Process according to claim 54, which comprises selecting silica gel as the inorganic emulsifier.

56. Process according to claim 52, which comprises adding an organic emulsifier.

57. Process according to claim 56, which comprises selecting starch (amylum soluble) as the organic emulsifier.

58. Process according to claim 32, which comprises intensively and homogeneously incorporating the inflating agent being at least substantially insoluble in the polyol raw material into the polyol raw material as the disperse phase of an emulsion, in which it is at least substantially insoluble.

59. Process according to claim 58, which comprises initially mixing the inflating agent with an emulsifier to form a mixture; distributing the mixture in the polyol raw material to form an emulsion; and uniting and foaming the emulsion with the isocyanate raw material.

60. Process according to claim 58, which comprises stirring the inflating agent being soluble in the polyol raw material into the polyol raw material to form a solution, and subsequently intensively and homogeneously incorporating the inflating agent being at least substantially insoluble in the polyol raw material into the solution in the polyol raw material, as a disperse phase of the emulsion in which it is at least substantially insoluble.

61. Process according to claim 59, which comprises stirring the inflating agent being soluble in the polyol raw material into the polyol raw material to form a solution; initially mixing the inflating agent with an emulsifier to form a mixture; distributing the mixture in the polyol raw material to form an emulsion; and uniting and foaming the emulsion with the isocyanate raw material component.

62. Process according to claim 31, which comprises selecting the inflating agents being at least substantially insoluble in at least one of the rigid foam raw materials as inflating agents of different chemical types.

63. Process for producing a rigid largely closed-cell polyurethane or polyisocyanurate foam having a cell structure formed by the expansion of rigid foam raw materials with carbon dioxide, which comprises forming a fine-celled rigid foam material by preparing an inflating agent being at least substantially insoluble in at least one of the rigid foam raw materials, homogeneously emulsifying the inflating agent in at least one of the rigid foam raw materials prior to the beginning of a chemical reaction, in the form of the disperse phase of an emulsion having a liquid droplet size at most equal to 10 $\mu$m in diameter and a proportion by weight of less than 3.5% of the rigid foam material, and selecting rigid foam raw materials including components for producing an essential required amount of inflating agent in the form of carbon dioxide.

64. Process according to claim 51, which comprises forming the cell structure by expansion of the rigid foam raw materials selected from the group consisting of polyols and isocyanates.

65. Process according to claim 51, which comprises additionally using at least one of activators and stabilizers to form the cell structure.

66. Process according to claim 51, which comprises providing the disperse phase of the emulsion with a liquid droplet size of less than 10 $\mu$m in diameter and a proportion by weight of less than 3.5% of the rigid foam material.

67. Process according to claim 51, which comprises providing the disperse phase of the emulsion with a liquid droplet size of approximately 10 $\mu$m in diameter and a proportion by weight of approximately 2% of the rigid foam material.

68. Process according to claim 51, which comprises providing the disperse phase of the emulsion with a liquid droplet size of approximately 4 $\mu$m in diameter and a proportion by weight of approximately 1% of the rigid foam material.

* * * * *